United States Patent [19]
Kostudus et al.

[11] Patent Number: 5,395,068
[45] Date of Patent: Mar. 7, 1995

[54] RECEIVER CASSETTE FOR WEB MATERIAL IN PARTICULAR FOR AN EXPOSED FILM WEB

[75] Inventors: Dimitrios Kostudis; Wilhelm Schall, both of Wedel, Germany

[73] Assignee: Mannesmann Aktiengesellschaft, Düsseldorf, Germany

[21] Appl. No.: 16,719

[22] Filed: Feb. 11, 1993

[51] Int. Cl.[6] .............................................. B65H 75/28
[52] U.S. Cl. ................................ 242/348.1; 242/586.5
[58] Field of Search ................. 242/71.1, 71, 74, 74.1, 242/195, 197, 67.1 R, 67.2, 67.3 R, 76, 348.1, 332.8, 532.5, 532.6, 586.5, 587.2

[56] References Cited

U.S. PATENT DOCUMENTS

| | | | |
|---|---|---|---|
| 2,373,704 | 4/1945 | Obolensky | 242/74.1 |
| 3,222,007 | 12/1965 | Schmuck | 242/71 |
| 3,586,258 | 6/1971 | Herlezeder | 242/197 |
| 3,802,646 | 4/1974 | Nagel | 242/195 |
| 3,978,495 | 8/1976 | Warscheit | 242/74.1 |
| 4,010,912 | 3/1977 | Dreher et al. | 242/74 X |
| 4,099,682 | 7/1978 | Benuska | 242/74 |
| 4,299,458 | 11/1981 | Burton | |
| 4,531,685 | 7/1985 | White | 242/74.1 |
| 4,544,110 | 10/1985 | Nagel et al. | 242/67.1 R |
| 4,770,361 | 9/1988 | Maeda | 242/67.1 R |
| 4,844,369 | 7/1989 | Kanayachi | 242/74 X |
| 5,197,687 | 3/1993 | Yamada et al. | 242/74.1 X |

FOREIGN PATENT DOCUMENTS

| | | |
|---|---|---|
| 2253677 | 1/1974 | Germany . |
| 0154852 | 4/1982 | Germany . |
| 3318311 | 11/1984 | Germany . |
| 3721922 | 1/1988 | Germany . |

Primary Examiner—John M. Jillions
Attorney, Agent, or Firm—Horst M. Kasper

[57] ABSTRACT

In a receiver cassette for web material (1), for example for an exposed film web material, the web material exits out of an optical flying spot scanning device (2). The web material (1) passes into an entrance slot (13a) a light-sealed casing (13). A rotatably supported hub (5) of a spool is disposed in the interior (13b) of the light-sealed casing (13). In order to increase the receiving capacity of web material lengths and in order to allow a fully automatic winding formation there is provided a motor-driven hub (5) of the spool. The hub (5) of the spool exhibits an about centric clamping slot (14). When a clamping slot entrance opening (16) of the hub (5) of the spool is directed substantially in upward direction in a base position (15) the hub (5) of the spool is furnished with position-defining means (18) in the end regions (17) of the hub (5) of the spool. The position-defining means (18) maintain the hub (5) of a spool in rest position in the base position (15). The position-defining means (18) can be switched into a non-interfering state by winding up of the web material (1).

23 Claims, 3 Drawing Sheets

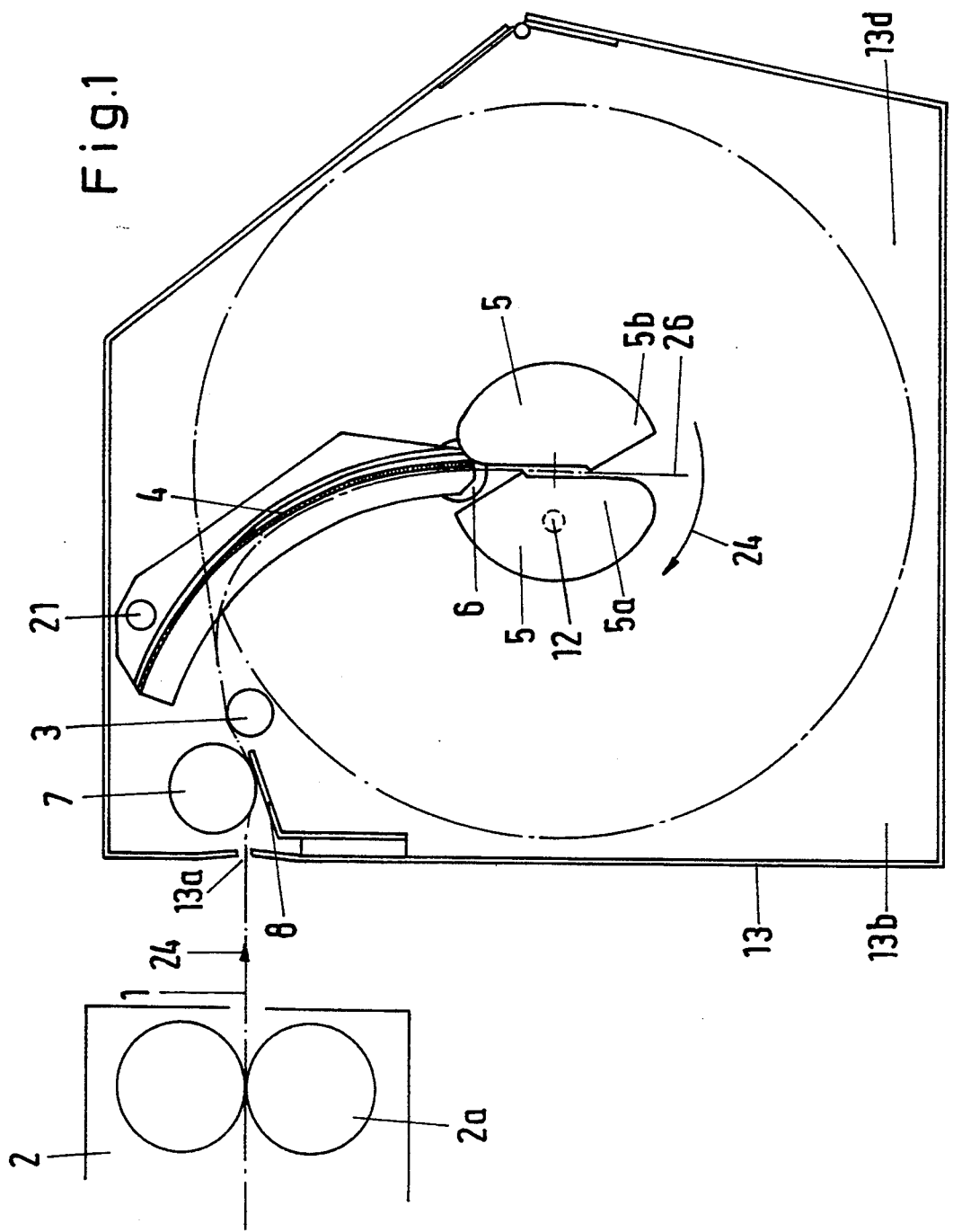

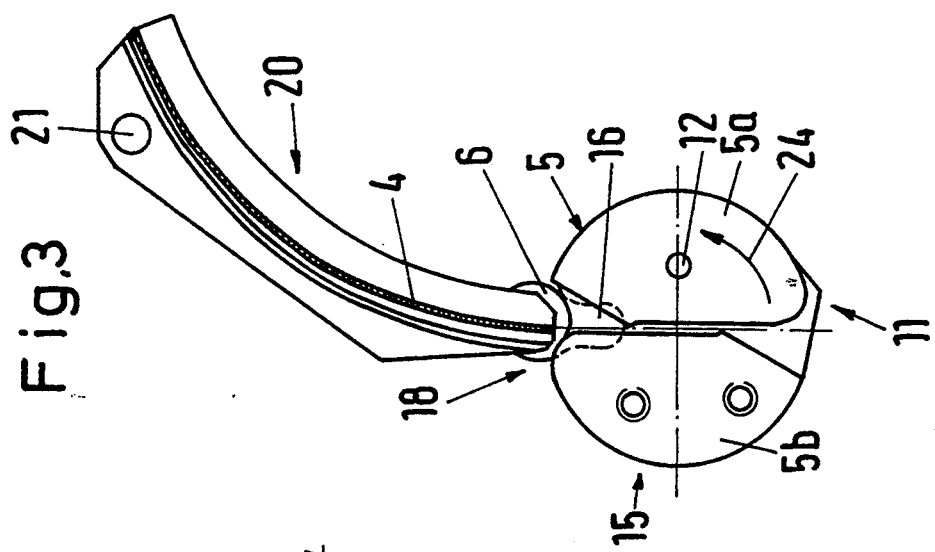
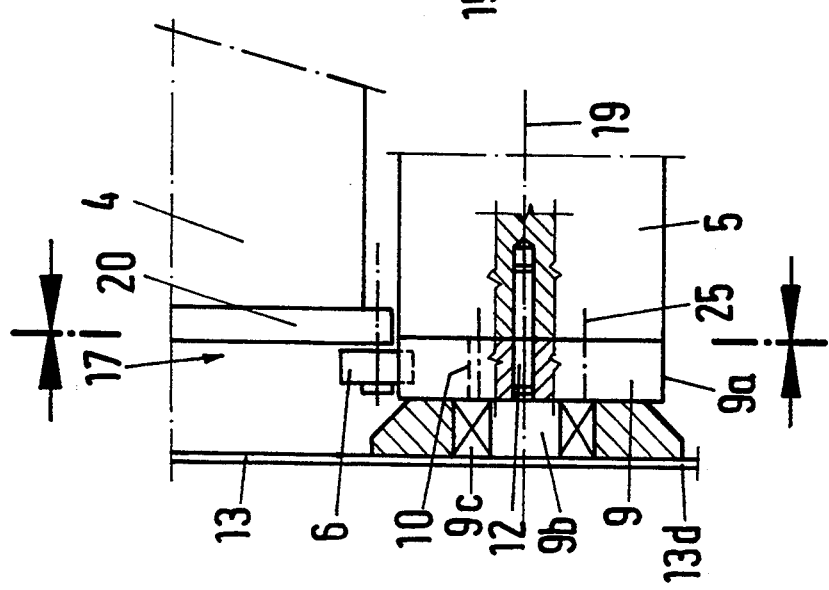
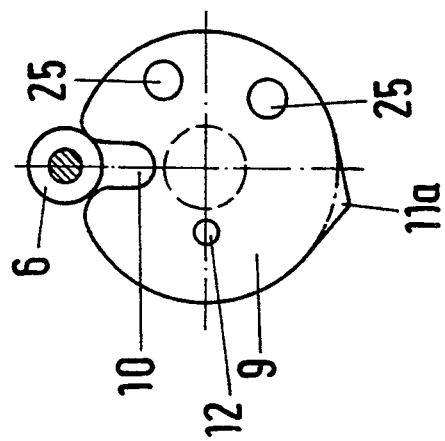

RECEIVER CASSETTE FOR WEB MATERIAL IN PARTICULAR FOR AN EXPOSED FILM WEB

BACKGROUND OF THE INVENTION

1. Field of the Invention

The invention relates to a receiver cassette for web material, in particular for an exposed film web material derived from an optical flying-spot scanning device.

2. Brief Description of the Background of the Invention Including Prior Art

It is known to construct an optical flying-spot scanning device in photo composition apparatus for a photosensitive web material such that the web material can be fed from a transmitter feed cassette, disposed in the first cassette receiver space, to an exposure section, wherein an efferent delivery roller pair for the transport of the web material through the exposure section is disposed in transport direction of the web material behind the exposure section. A further cassette receiver space for receiver cassettes is furnished behind the efferent transfer roller pair and the insertion roller pairs and the delivery roller pairs of the optical flying-spot scanning device are subdivided in their longitudinal direction into several differently drivable or, respectively, idling sections, as taught in the German Patent document DE-C2-33 18 311.

Receiver cassettes for web material are in this case constructed such that a winding up corresponding to the advance speed of the transport system is performed in the flying-spot scanning device based on the self tension and/or internal stress of the web material. Such optical flying-spot scanning devices offer in addition the possibility to transfer the drive motion for the web material synchronous onto another apparatus through gear wheel drives.

The winding up without hub of a wheel is in addition known from the German Democratic Republic Patent document DD-PS 0 154 852. A system of a flat-lying web material is provided according to the U.S. Pat. No. 4,299,458, wherein the web material is wound within a receiver cassette onto a hub of a coil. This hub of a coil however comprises a drum and several press-on rollers distributed over the circumference of the drum such that, upon rotation of the drum and while the press-on rollers remain still standing, there is performed a winding up of the web material. It has to be considered in this context that the press-on rollers are resting on the side of the web material which is not covered with the photo-sensitive layer. Therefore, it is in general assumed that in case of a web material, which essentially comprises an illuminated and exposed film web, the exposed side then forms the inner side surface of the web material.

The deficiency of only a short web length being able to store in the receiver cassette is common to all previously known solutions such that the capacity or, respectively, the use of the capacity upstream disposed flying-spot scanning devices has to remain small. Simultaneously, the use of exposure material relatively rises when the productivity capacity is low, because substantial lengths of the web material are used up while still unexposed. The known receiver cassettes therefore have only a small receiving capacity, they are expensive to operate and they are subjected to a high use of material to be exposed.

SUMMARY OF THE INVENTION

1. Purposes of the Invention

It is an object of the present invention to furnish a receiver capacity of the receiver cassette for web material which corresponds to that of the feed transfer capacity, wherein a fully automatic threading and inserting and winding up of the web material is to be accomplished as well as a fully automatic clamping of the web material end and a winding up of differing web material widths.

It is another object of the present invention to provide a winding spool, which is of simple construction and which reliably allows to collect light-sensitive tape materials such as exposed photographic film webs.

It is yet a further object of the present invention to provide a cassette for collecting exposed film material, which provides a reliable clamping and feeding construction.

These and other objects and advantages of the present invention will become evident from the description which follows.

2. Brief Description of the Invention

According to the present invention, there is provided for a receiver cassette for web material. A casing of the receiver cassette has an interior and is attached sealingly against light passage to the device delivering web material. Said casing includes a casing entrance slot. The web material is insertable into said casing entrance slot. A spool has a rotation axis and includes a rotatably supported hub. The rotatably supported hub of the spool is disposed in the interior of the casing. The hub of the spool can be composed of a first half-hub of the spool and a second half-hub of the spool having the same shape. The first half-hub of the spool can be disposed on the rotary disk and further disposed rotatable around a centrically disposed swivel axis. The second half-hub of the spool can be disposed on the rotary disk and can be rigidly connected by the end regions of the second-half hub of the spool in each case at the rotary disk. The rotary disk can be rotatably supported around a rotation axis supported in side walls.

A clamping slot is disposed at the hub and is about centered around the rotation axis. The clamping slot can be formed between the two half-hubs of the spool. The clamping slot can have a width of from about 0.1 mm to 0.5 mm. The clamping slot has an entrance opening directed substantially upwardly. The entrance opening of the clamping slot can be formed by a rounding off at the second half-hub of the spool and by an oppositely disposed bevel at the first half-hub of the spool.

Means are provided for driving the rotatably supported hub. Position-defining means for defining a base position are furnished in end regions of the hub. Said position-defining means maintain the hub of the spool during standstill in a predetermined base position. The position-defining means are switchable into a non-interfering state based on a winding up of the web material.

A recess can be disposed at a peripheral circumference of the rotary disk for an engagement of the position-defining means. An additional mass can be disposed outside of the rotation axis and about opposite to the recess disposed at the peripheral circumference. The additional mass for generating a torque can be formed as a cam.

The position-defining means can be provided by a direction-controlling roller rotatably supported at the lever. The direction-controlling roller can engage into the recess in the base position. The lever can be rotatably supported in the side walls. The lever can be connected to like levers disposed sequentially in a direction of the rotation axis of the rotary disk.

A connection between the lever and the like levers, supporting direction-controlling roller, can be formed out of the guide arc. The web material can rest at the beginning of a winding process and during the winding process at the guide arc.

The device delivering the web material can be provided as an exposed film web material derived from an optical flying-spot scanning device.

A drive force for the hub of the spool can be derived from the drive of the flying-spot scanning device.

The hub of the spool can be connected to a motor in order to be driven by the motor.

A ramp-like extending rail can be disposed behind the casing entrance slot. A press-on roller can be disposed at a slot distance opposite to the ramp-like extending rail. A deflection axle can be disposed in transport advance direction relative to the rail and supported between side walls of the casing.

The present invention allows the advantage that, based on the positional determination of the hub of the spool, there can be performed an automatic feeding in and threading in and a subsequent winding up. Thus, the web material can be easily inserted and threaded based on a positionally defined base position of the hub of the spool and it becomes possible to again switch off these position defining means solely based on the web material. Thus, a fully automatic insertion, threading, and winding up can be achieved, wherein the receiving capacity is increased by an about 8 to 10-fold increase relative to the conventional receiver cassettes.

It is however also possible in this context to derive and pick-up the drive of and the driving power for the hub of the spool either from the upstream disposed optical flying-spot scanning device or to flange-mount a drive on the receiver cassette, where the flange-mounted drive can be correspondingly controlled.

According to a preferred embodiment of the invention, it is provided that the hub of the spool is composed of a first half-hub of the spool and of a second half-hub of the spool. The first half-hub of the spool is rotatable around a centrically located swiveling axis. The second half-hub of the spool is disposed rigidly with its end areas in each case at rotary disks. The rotary disks are rotatably supported in the side walls of the receiver cassette around a common center axis. It is thereby possible to determine and set the position of the hub of the spool by the gravity of the half-hub of the spool disposed rotatable around a swiveling axis.

According to further features of the invention, it is provided that the rotary disks or the turn tables are in each case furnished with recesses at the periphery of the rotary disk for the engagement of the position-defining means. An additional mass is disposed outside of the center axis and located about opposite to the recesses at the periphery of the rotary disk. In this way a torque is generated, which supports a motion of the rotary disks in such way that the hub of the spool is always rotated into the desired position, where the clamping slot entrance opening is directed upwardly. This achieves always a definite positioning of the hub of the spool in a base position.

This principle can be easily accomplished by providing the additional mass for the generation of a torque by a cam. Thereby the additional mass can be molded at the rotatable half-hub of the spool already at the time of production.

A further improvement of the invention comprises that rotary-supported direction-controlling rollers at levers serve as position-defining means. The direction-controlling rollers engage in the base position into the recesses of the rotary disk. The levers are in each case rotatably supported in the side walls and are connected to each other in the direction of the rotary disk center axis. Advantageously, the direction-controlling rollers initially lock the two rotary disks in position, where the one half-hub of the spool is rigidly attached to the rotary disks and the second half-hub of the spool is rotatably supported at the rotary disks. The direction-controlling rollers themselves are lifted up through their mutual connection by the web material after the first spool rotation and the direction-controlling rollers in turn release thus the positional and the locked-in position of the rotary disks and thus of the two half-hubs of the spool.

It is advantageous in this context that the connection between the levers supporting the direction-controlling rollers are composed of a guide arc. The web material rests at the guide arc at the start, during the insertion process, during the threading process as well as during the winding process after the first rotation.

The production of the receiver cassette is substantially simplified by providing that the hub of the spool is composed of two half-hubs of the spool having the same shape. Such a production technique requires only one single injection molding tool.

A further embodiment of the invention comprises that the clamping slot entrance opening is formed by a rounding off at one half-hub of the spool and by an oppositely disposed inclined bevel at the other half-hub of the spool. Here again, the principle of one single injection molding tool can be employed by placing the inner faces of the two half-hubs against each other such that the corresponding clamping slot entrance openings are generated two times at the peripheral circumference.

It is advantageous for two half-hubs of the spool to form between themselves a clamping slot having a width of an order of magnitude of 0.1 to 0.5 mm in the case of a web material which comprises, for example, film material.

Further advantages result in that, during the delivery of a flying-spot scanning device with a feed cassette and with a receiver cassette, the drive force for the hub of the spool is derived from the drive of the flying spot scanning device such that a flange-mounting of a second motor can be dispensed with. Rather, it suffices that the flying spot scanning device and the hub of the spool are driven with only one common drive motor.

Further advantages of the invention result from disposing a ramp-like extending rail behind the entrance slot. A press-on roller is disposed with a slot distance opposite to the ramp-like extending rail. A deflection axis is disposed between the side walls of the casing following to the rail, as seen in transport direction. The rail and the press-on roller secure the receiver cassette of the exposed film not only against an entrance of light and exposure by impingement of light, but they also mechanically clamp the starting end of the web material and they allow to easily reinsert again the starting end of the web material into the development machine during further treatment, for example during development of the film.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 1 shows a front elevational and in part sectional view through the receiver cassette with an upstream-disposed optical flying spot scanning device;

FIG. 2 shows a side elevational and in part longitudinal sectional view through the hub of the spool with the position-defining means;

FIG. 3 shows a front elevational and in part sectional view of the embodiment of FIG. 1 at the separation line between the left rotary disk and the hub of the spool, including the direction-controlling roller and the movable guide arc;

FIG. 4 shows an elevational and in part sectional view of the embodiment of FIG. 1 at the separation location between the left rotary disk and the hub of the spool, with a view onto the rotary disk with the direction-controlling roller;

DESCRIPTION OF INVENTION AND PREFERRED EMBODIMENT

Figure 5:
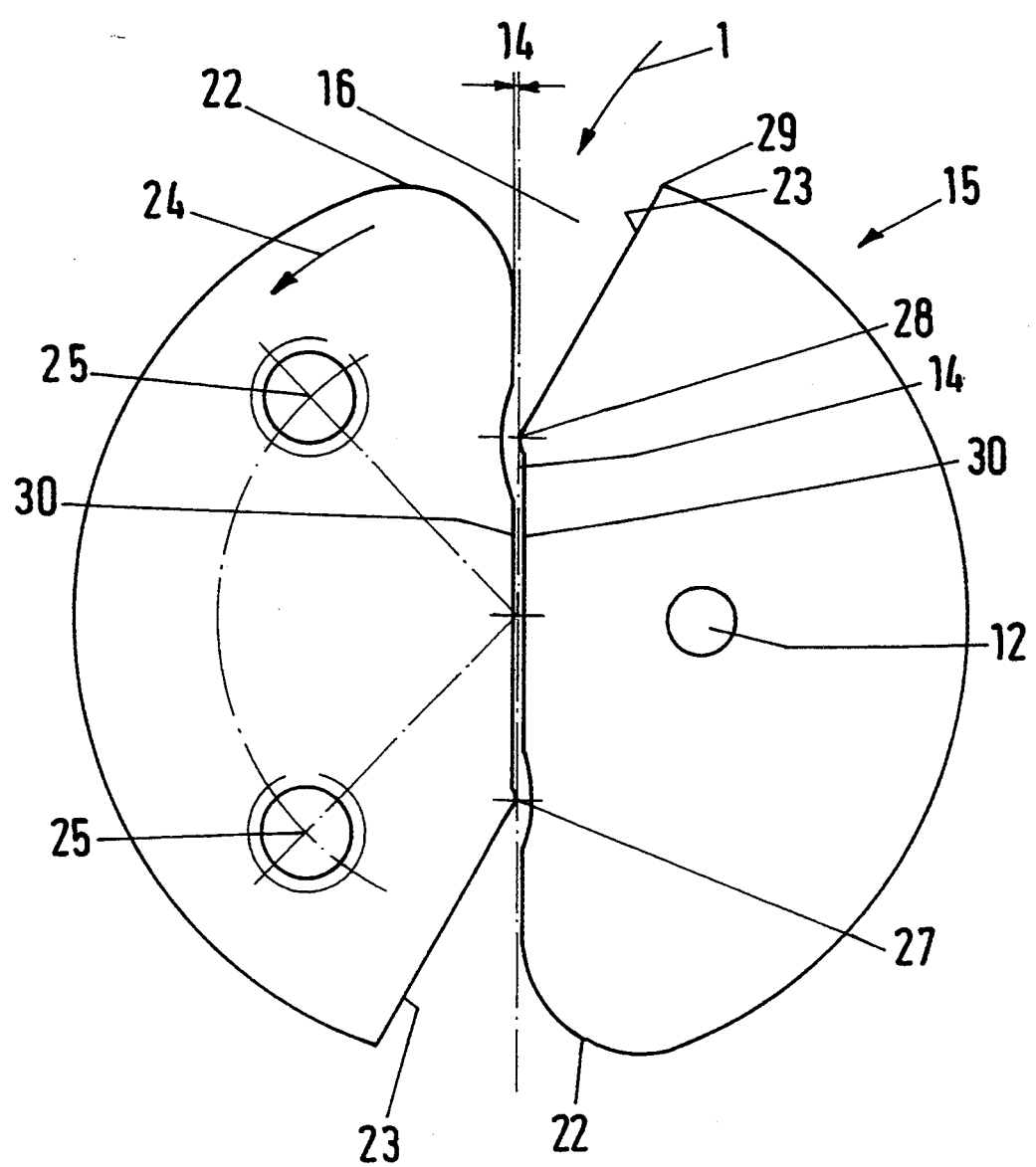
FIG. 5 shows a front elevational view of the two half-hubs of the spool in an enlarged representation.

According to the present invention, there is provided for a receiver cassette for web material, in particular for an exposed film web material derived from an optical flying-spot scanning device. The film web material is discharged driven by the flying-spot scanning device and is insertable into an entrance slot of a casing, which is sealingly attached at the flying-spot scanning device against light. A rotatably supported motor-driven hub 5 of a spool is disposed in the interior of the casing. A drive force for the hub 5 of the spool can be derived from the drive of the flying-spot scanning device 2. The hub 5 of the spool exhibits an about centered clamping slot 14. The hub 5 of the spool, with a clamping slot entrance opening 16 directed substantially upwardly in a base position 15, shown in FIGS. 3 and 5, is furnished in its end regions 17 with position-defining means 18. The position-defining means 18 are provided by direction-controlling rollers 6. Said position-defining means 18, illustrated in FIG. 2, maintain the hub 5 of the spool during standstill in the base position 15. The position-defining means 18 can be switched into a non-interfering state based on a winding up of the web material 1.

The hub 5 of the spool can be composed of a first half-hub 5a of the spool and a second half-hub 5b of the spool produced of substantially uniform construction. The first half-hub 5a of the spool and the second half-hub 5b of the spool can have the same shape. The clamping slot 14 can be formed between the two half-hubs 5a and 5b of the spool. The clamping slot 14 can have a width of from about 0.1 mm to 0.5 mm for a film web between the half-hubs 5a and 5b of the spool at the clamping face 30. A rounding 22 at the second half-hub 5b of the spool and an oppositely disposed bevel 23 at the first half-hub 5a of the spool can form the clamping slot entrance opening 16. The hubs 5a and 5b of the spool can be formed such that the bevel is located in the direction of the advance of the hub 5 of the spool. The first half-hub 5a of the spool can be disposed on rotary disks 9 and further disposed rotatable around a centrically disposed swivel axis 12. The second half-hub 5b of the spool can be rigidly connected with attachment means 25 by the end regions 17 of the second-half hub 5b of the spool in each case to rotary disks 9. The unit, including the half-hubs 5a and 5b of the spool and the rotary disks 9, is rotary supported around the rotation axis 9b in the side walls 13d by way of rotary bearings 9c. The unit is also rotatable around the center axis 19.

The rotary disks 9 in each case can be furnished with recesses 10 at a peripheral circumference 9a engaging the position-defining means 18. An additional mass 11 can be disposed outside of the center axis 19 and about opposite to the recesses 10 at the peripheral circumference 9a of the rotary disk 9. The additional mass 11 for generating a torque can be formed as a cam 11a and can be molded at the rotatable half hub of the spool.

Direction-controlling rollers 6, rotatably supported at levers 20, can serve as the position-defining means 18. The direction-controlling rollers 6 can engage into the recesses 10 in the base position 15. The levers 20 can in each case be rotatably supported in the side walls 13d. The levers 20 can be connected to each other perpendicular to the center axis 19 of the rotary disks. The connection between the levers 20, supporting the direction-controlling rollers 6, can be formed out of a guide arc 4. The web material 1 can rest at the beginning of a winding process and during the winding process at the guide arc 4.

A ramp-like running rail 8 can be disposed behind the entrance slot 13a. A press-on roller 7 can be disposed at a slot distance opposite to the rail 8. A deflection axle 3, following in transport direction 24 to the rail 8, can be supported between the side walls 13d of the casing 13.

The procedure for moving the web material, in particular exposed film, in the receiver cassette is described in the following.

The web material 1, for example a film web, is moved from the flying-spot scanning device 2 with the driven roller pair 2a in transport direction 24 into the receiver cassette with the casing 13. The web material 1 is guided at the deflection axle 3 and passes initially, prebent under self tension and internal stress or also resting at the movable guide arc 4, into the hub 5 of a spool.

Prior to inserting and threading the starting end of the web material, the direction-controlling rollers 6 engage in the base position into respective recesses 10 of rotary disks 9 and thereby define the base position 15. The hub 5 of the spool is not driven in this situation, i.e. the hub 5 of the spool stands idle in its base position 15. In this position shown in FIG. 1 the roller pair 2a transports the web material 1 through an entrance slot 13a between a ramp-like disposed rail 8 and a press-on roller 7 into the interior 13b of the casing 13. The starting end of the web material passes, either based on the internal stress and the self-tension or guided through the movable guide arc 4, into the clamping-slot entrance opening 16 up to the position designated in the FIG. 1 with the reference numeral 26. In this position 26, a clamping in at the clamping point 27 is achieved already based on the movability of the half-hub 5a of the spool. Similarly, a clamping and holding of the web material 1 occurs at the clamping point 28. Depending on the configuration and embodiment of the clamping-slot entrance opening 16, the web material 1 also rests and is lodged already at a point 29. In the embodiment of the hub 5 of the spool according to FIG. 5, a clamping face 30 is also present in addition to the clamping points 27 and 28.

The hub 5 of the spool is rotated, as shown in FIG. 2, after a rotation in transport direction 24 performed by a drive motor of the flying-spot scanning device 2, not illustrated. The cam 11a, which is provided at the rotary disk 9, generates a clockwise torque as illustrated in FIG. 3 and the half-hub 5a of the spool generates a counter-clockwise torque around the swivel axis 12, such that there is assured a clamping of the web material 1 even in case where direction-controlling rollers 6 are non-engaging.

As soon as the drive motor starts to rotate the hub 5 of the spool over the rotary disks 9, there does not only occur a further clamping of the web material 1, but during the further course, as illustrated in FIG. 2, the guide arc 4 or another connection between the levers 20, supporting the direction-controlling rollers 6, is lifted up by the web material 1 such that the direction-controlling rollers 6 are moved out of their recesses 10, as illustrated in FIG. 4, wherein the levers 20 are rotary supported around the lever rotary axis 21 in the side walls 13d. Now the hub 5 of the spool can be rotary driven synchronously with the motion of the roller pair 2a and the web material 1 is wound up at a large length.

The energy of the wound-up exposure material, opposing the drive motor of the hub of the spool, based on the rotary torsion spring effect, and the thereby resulting tensile force, required for the clamping of the starting end of the web material, onto the point 29 of the movable half-hub 5a of the spool is maintained by a rewinding interlock and/or backstop means. This maintains a firm and stable web material coil in every operating phase and condition. The control of the spool drive firmly connected to the flying-spot scanning device 2 is performed by the flying-spot scanning device 2.

The connection of the receiver cassette to the spool drive of the flying spot scanning device 2 is performed automatically by insertion of the receiver cassette. Preferably, a gear wheel drive, not illustrated in detail, is employed in the embodiment. At least one side of the gear wheel drive exhibits a free-wheel, which free-wheel automatically assures the engagement of the gear teeth.

The end edge of the web material is fixed by the press-on roller 7 after the separation of the web material 1 by a cutting device at the flying spot scanning device 2. The press-on roller 7, which presses against the inclined rail 8, prevents in addition an entry, a penetration and an impinging of external light onto the web.

After a first rotation of the hub 5 of the spool, the guide arc 4 is lifted up by the web material 1 to be wound up such that the direction-controlling rollers 6 move out of and exit from the recess 10 in the rotary disk 9 and that the hub 5 of the spool is unblocked and released in both rotation directions and that the receiver cassette can be inserted and placed into a development device for delivering, withdrawing and removing the web material.

It will be understood that each of the elements described above, or two or more together, may also find a useful application in other types of receiver cassettes differing from the types described above.

While the invention has been illustrated and described as embodied in the context of receiver cassettes for web material in particular for exposed film webs, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A receiver cassette for web material comprising
a device delivering the web material;
a casing having an interior and attached sealingly against light passage to the device delivering web material, and said casing including a casing entrance slot, and wherein the web material is insertable into said casing entrance slot;
a spool having a rotation axis and including a rotatably supported hub, wherein the rotatably supported hub of the spool is disposed in the interior of the casing;
a clamping slot disposed at the hub and about centered around the rotation axis, wherein the clamping slot has an entrance opening directed substantially upwardly;
means for driving the rotatably supported hub;
position-defining means for defining a base position furnished in end regions of the hub,
wherein the position-defining means are provided by a direction controlling roller, and wherein the position-defining means maintain the hub of the spool during standstill in the predetermined base position, and wherein the position-defining means are switchable into a non interfering state based on a winding up of the web material,
wherein the hub of the spool is composed of a first half-hub of the spool and a second half-hub of the spool,
wherein the first half hub is rotatable around an axis disposed parallel to the clamping slot,
wherein the second half-hub is fixedly attached to the spool,
wherein the first half-hub includes a projecting clamping protrusion in the area of the clamping slot,
wherein the second half-hub includes a recess to be engaged by the clamping protrusion,
wherein the recess exhibits a larger absolute value of the radius of curvature as compared to the radius of curvature of the clamping protrusion at the engagement position of the clamping protrusion and the recess.

2. A receiver cassette for web material comprising
a device delivering the web material;
a casing having an interior and attached sealingly against light passage to the device delivering the web material, and said casing including a casing entrance slot, and wherein the web material is insertable into said casing entrance slot;
a spool having a rotation axis and including a rotatably supported hub, wherein the rotatably supported hub of the spool is disposed in the interior of the casing;
a clamping slot disposed at the hub and about centered around the rotation axis, wherein the clamping slot has an entrance opening directed substantially upwardly;

means for driving the rotatably supported hub;

position-defining means for defining a base position furnished in end regions of the hub, which position-defining means maintain the hub of the spool during standstill in the predetermined base position, and wherein the position-defining means are switchable into a non interfering state based on a winding up of the web material;

a rotary disk, wherein the hub of the spool is composed of a first half-hub of the spool and a second half-hub of the spool, and wherein the first half-hub of the spool is disposed on the rotary disk and further disposed rotatable around a centrically disposed swivel axis, and wherein the second half-hub of the spool is disposed on the rotary disk and is rigidly connected by the end regions of the second-half hub of the spool in each case at the rotary disk, and wherein the rotary disk is rotatably supported around a rotation axis supported in side walls;

a recess disposed at a peripheral circumference of the rotary disk for an engagement of the position-defining means;

an additional mass molded at the first half hub of the spool, disposed outside of the rotation axis and about opposite to the recess disposed at the peripheral circumference.

3. The receiver cassette according to claim 2, wherein the additional mass for generating a torque is formed as a cam.

4. The receiver cassette according to claim 2, further comprising a lever, wherein a direction-controlling roller is rotatably supported at the lever, wherein the direction-controlling roller engages into the recess in the base position, wherein the lever is rotatably supported in the side walls, and wherein the lever is connectable to like levers disposed sequentially in a direction of the rotation axis of the rotary disk.

5. The receiver cassette according to claim 4, further comprising a guide arc, wherein a connection between the lever and the like levers, supporting direction-controlling rollers, is formed out of the guide arc, wherein the web material rests at the beginning of a winding process and during the winding process at the guide arc.

6. A receiver cassette for web material comprising a device delivering the web material;

a casing having an interior and attached sealingly against light passage to the device delivering web material, and said casing including a casing entrance slot, and wherein the web material is insertable into said casing entrance slot;

a spool having a rotation axis and including a rotatably supported hub, wherein the rotatably supported hub of the spool is disposed in the interior of the casing;

a clamping slot disposed at the hub and about centered around the rotation axis, wherein the clamping slot has an entrance opening directed substantially upwardly;

means for driving the rotatably supported hub;

position-defining means for defining a base position furnished in end regions of the hub, wherein the position-defining means are provided by a direction controlling roller, and wherein the position-defining means maintain the hub of the spool during standstill in the predetermined base position, and wherein position-defining means are switchable into a non interfering state based on a winding up of the web material, wherein the hub of the spool is composed of a first half-hub of the spool and a second half-hub of the spool, wherein the first half hub is rotatable around an axis disposed parallel to the clamping slot, wherein the second half-hub is fixedly attached to the spool, wherein the first half-hub includes a clamping protrusion, wherein the second half-hub includes a recess to be engaged by the clamping protrusion, wherein the recess exhibits a larger absolute value of the radius of curvature as compared to the radius of curvature of the clamping protrusion at the engagement position of the clamping protrusion and the recess.

7. A receiver cassette for web material comprising a device delivering the web material;

a casing having an interior and attached sealingly against light passage to the device delivering web material, and said casing including a casing entrance slot, and wherein the web material is insertable into said casing entrance slot;

a spool having a rotation axis and including a rotatably supported hub, wherein the rotatably supported hub of the spool is disposed in the interior of the casing;

a clamping slot disposed at the hub and about centered around the rotation axis, wherein the clamping slot has an entrance opening directed substantially upwardly;

means for driving the rotatably supported hub; position-defining means for defining a base position furnished in end regions of the hub, which position-defining means maintain the hub of the spool during standstill in the predetermined base position, and wherein the position-defining means are switchable into a non interfering state based on a winding up of the web material, wherein the hub is formed of a first half-hub and of a second half-hub, and wherein the entrance opening of the clamping slot is formed by a rounding at the first half-hub of the spool and by an oppositely disposed bevel at the second half-hub of the spool.

8. The receiver cassette according to claim 7, wherein the clamping slot is formed between the two half-hub of the spool and the second half-hub of the spool, and wherein the clamping slot has a width of from about 0.1 mm to 0.5 mm.

9. The receiver cassette according to claim 7, wherein the device delivering the web material is a flying-spot scanning device, wherein the flying-spot scanning device includes a drive, and wherein a drive force for the hub of the spool is derived from the drive of the flying-spot scanning device, and wherein the connection of the receiver cassette to the spool drive of the flying spot scanning device is performed automatically by insertion of the receiver cassette.

10. The receiver cassette according to claim 7, wherein the device delivering the web material is an optical flying-spot scanning device;
wherein the web material is provided as an exposed film web material derived from the optical flying-spot scanning device;
wherein the hub of the spool is connected to a motor in order to be driven by the motor.

11. The receiver cassette according to claim 7 further comprising
a rotary disk, and
wherein the first half-hub of the spool is disposed on the rotary disk and further disposed rotatable around a centered swivel axis disposed relative to the first hub, and wherein the second half-hub of the spool is disposed on the rotary disk and is rigidly connected by the end regions of the second-half hub of the spool in each case at the rotary disk, and wherein the rotary disk is rotatably supported around a rotation axis supported in side walls.

12. A receiver cassette for web material comprising
a device delivering the web material;
a casing having an interior and attached sealingly against light passage to the device delivering the web material, and said casing including a casing entrance slot, and wherein the web material is insertable into said casing entrance slot;
a spool having a rotation axis and including a rotatably supported hub, wherein the rotatably supported hub of the spool is disposed in the interior of the casing;
a clamping slot disposed at the hub and about centered around the rotation axis, wherein the clamping slot has an entrance opening directed substantially upwardly;
means for driving the rotatably supported hub;
position-defining means for defining a base position furnished in end regions of the hub, which position-defining means maintain the hub of the spool during standstill in the predetermined base position, and the wherein position-defining means are switchable into a non interfering state based on a winding up of the web material,
a ramp-like extending rail disposed behind the casing entrance slot;
a press-on roller disposed at a slot distance opposite to the ramp-like extending rail; a deflection axle disposed in transport advance direction relative to the rail and supported between side walls of the casing.

13. A receiver cassette for web material, in particular for an exposed film web material derived from an optical flying-spot scanning device, wherein the film web material is discharged driven by the flying-spot scanning device, and wherein the film web material is insertable into an entrance slot, wherein a casing is sealingly attached at the flying-spot scanning device against light, wherein a rotatably supported hub (5) of a spool is disposed in the interior of the casing, wherein the hub (5) of the spool is motor driven wherein the hub (5) of the spool exhibits an about centered clamping slot (14), and wherein the hub (5) of the spool, with a clamping slot entrance opening (16) directed substantially upwardly in a base position (15), is furnished in its end regions (17) with position-defining means (18), wherein the position-defining means are provided by a direction controlling roller, and wherein the position-defining means (18) maintain the hub (5) of the spool during standstill in the base position (15), and wherein the position-defining means (18) can be switched into a non-interfering state based on a winding up of the web material (1),
wherein a side of the slot entrance opening is furnished with a bevel for introducing the film into the slot and wherein a projecting clamping protrusion is disposed at a junction of bevel and slot for retaining the film hooked in position in the slot.

14. The receiver cassette according to claim 13,
wherein the hub (5) of the spool is composed of a first half-hub (5a) of the spool and a second half-hub (5b) of the spool, and wherein the first half-hub (5a) of the spool is disposed on rotary disks (9) and further disposed rotatable around a swivel axis (12), and wherein the second half-hub (5b) of the spool is rigidly connected by end regions (17) of the second half-hub (5b) of the spool in each case to the rotary disks (9), and wherein the rotary disks (9) are rotatably supported around a common center axis (19) in side walls (13d).

15. A receiver cassette for web material, in particular for an exposed film web material derived from an optical flying-spot scanning device, wherein the film web material is discharged driven by the flying-spot scanning device, and wherein the film web material is insertable into an entrance slot, wherein a casing is sealingly attached at the flying-spot scanning device against light, wherein a rotatably supported hub (5) of a spool is disposed in the interior of the casing, wherein the hub (5) of the spool is motor driven wherein the hub (5) of the spool exhibits an about centered clamping slot (14), and wherein the hub (5) of the spool, with a clamping slot entrance opening (16), directed substantially upwardly in a base position (15), is furnished in its end regions (17) with position-defining means (18), which position-defining means (18) maintain the hub (5) of the spool during standstill in the base position (15), and wherein the position-defining means (18) can be switched into a non-interfering state based on a winding up of the web material (1);
wherein the hub (5) of the spool is composed of a first half-hub (5a) of the spool and a second half-hub (5b) of the spool, and wherein the first half-hub (5a) of the spool is disposed on rotary disks (9) and further disposed rotatable around a swivel axis (12) and wherein the second half-hub (5b) of the spool is rigidly connected by end regions (17) of the second half-hub (5b) of the spool in each case to the rotary disks (9), and wherein the rotary disks (9) are rotatably supported around a common center axis (19) in side walls (13d);
wherein the rotary disks (9) in each case are furnished with recesses (10) at a peripheral circumference (9a) engaging the position-defining means (18), and wherein an additional mass (11) is disposed outside of the center axis (19) and about opposite to the recesses (10) at the peripheral circumference (9a).

16. The receiver cassette according to claim 15, wherein the additional mass (11) for generating a torque is formed as a cam (11a).

17. The receiver cassette according to claim 15, wherein direction-controlling rollers (6), rotatably supported at levers (20), serve as the position-defining means (18), wherein the direction-controlling rollers (6) engage into the recesses (10) in the base position (15), wherein the levers (20) are in each case rotatably supported in the side walls (13d), and wherein the levers

(20) are connected to each other in direction of the center axis (19) of the rotary disks.

18. The receiver cassette according to claim 17, wherein the connection between the levers (20), supporting the direction-controlling rollers (6), is formed out of a guide arc (4), wherein the web material (1) rests at the beginning of a winding process and during the winding process at the guide arc (4).

19. The receiver cassette according to claim 15, wherein the half-hubs (5a, 5b) of the spool have the same shape.

20. A receiver cassette for web material, in particular for an exposed film web material derived from an optical flying-spot scanning device, wherein the film web material is discharged driven by the flying-spot scanning device, and wherein the film web material is insertable into an entrance slot, wherein a casing is sealingly attached at the flying-spot scanning device against light, wherein a rotatably supported hub (5) of a spool is disposed in the interior of the casing, wherein the hub (5) of the spool is motor driven, wherein the hub (5) of the spool exhibits an about centered clamping slot (14), and wherein the hub (5) of the spool, with a clamping slot entrance opening (16) directed substantially upwardly in a base position (15), is structured in its end regions (17) to be engaged by a position-defining means (18), which position-defining means (18) maintain the hub (5) of the spool during standstill in the base position (15), and wherein said position-defining means (18) can be switched into a non-interfering state based on a winding up of the web material (1), wherein the clamping slot entrance opening (16) is formed by a rounding (22) at one half-hub (5a, 5b) of the spool and by an oppositely disposed bevel (23) at a second half-hub (5a, 5b) of the spool and wherein the rounding (22) and the bevel 27 are followed by a slot 30, wherein a projecting clamping protrusion is formed at a point where the bevel and a respective wall of the slot join.

21. The receiver cassette according to claim 20, wherein a clamping slot (14) is formed between the two half-hubs (5a, 5b) of the spool, and wherein the clamping slot (14) has a width of from about 0.1 mm to 0.5 mm.

22. The receiver cassette according to claim 20, wherein a drive force for the hub (5) of the spool is derived from the drive of the flying-spot scanning device (2), and wherein the connection of the receiver cassette to the spool drive of the flying spot scanning device is performed automatically by insertion of the receiver cassette.

23. A receiver cassette for web material, in particular for an exposed film web material derived from an optical flying-spot scanning device, wherein the film web material is discharged driven by the flying-spot scanning device, and wherein the film web material is insertable into an entrance slot, wherein a casing is sealingly attached at the flying-spot scanning device against light, wherein a rotatably supported hub (5) of a spool is disposed in the interior of the casing, wherein the hub (5) of the spool is motor driven, wherein the hub (5) of the spool exhibits an about centered clamping slot (14), and wherein the hub (5) of the spool, with a clamping slot entrance opening (16) directed substantially upwardly in a base position (15), is furnished in its end regions (17) with position-defining means (18), which position-defining means (18) maintain the hub (5) of the spool during standstill in the base position (15), and wherein the position-defining means (18) can be switched into a non-interfering state based on a winding up of the web material (1), wherein a ramp-like running rail (8) is disposed behind the entrance slot (13a), wherein a press-on roller (7) is disposed at a slot distance opposite to the rail (8), and wherein a deflection axle (3), following in transport direction (24) to the rail (8), is supported between the side walls (13d) of the casing (13). The present invention relates to a receiver cassette for web material, in particular for an exposed film web material derived from an optical flying-spot scanning device and can be molded at the rotatable half hub of the spool

* * * * *